July 29, 1969   E. VOGELI   3,458,170
PRESSURE GRADIENT VALVE
Filed Jan. 24, 1967   2 Sheets-Sheet 2

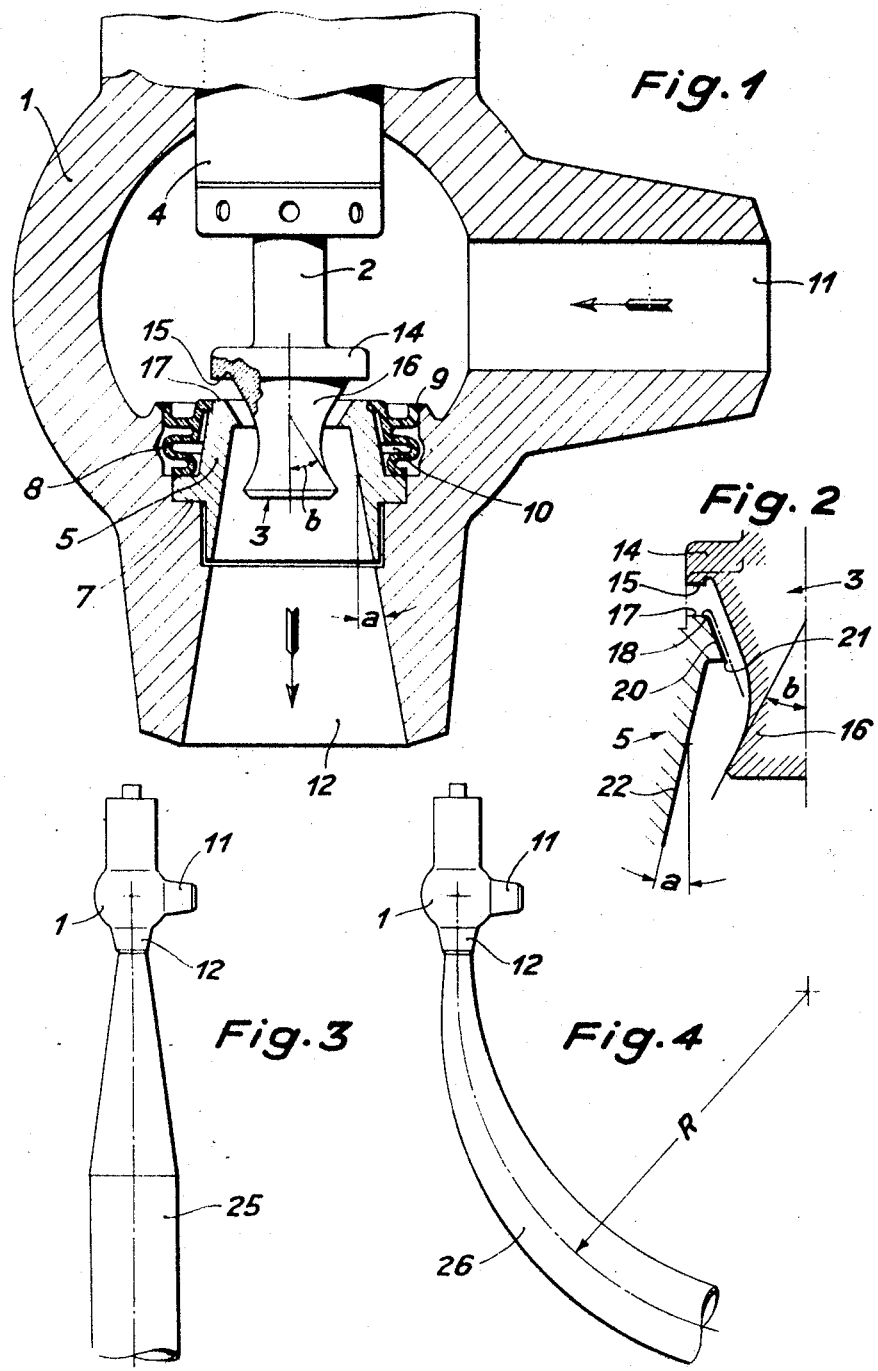

Inventor:
ERNST VOGELI
BY
Kenyon & Kenyon
ATTORNEYS

United States Patent Office 3,458,170
Patented July 29, 1969

3,458,170
PRESSURE GRADIENT VALVE
Ernst Vogeli, Wiesendangen, Zurich, Switzerland, assignor to Sulzer Brothers, Limited, Winterthur, Switzerland, a corporation of Switzerland
Filed Jan. 24, 1967, Ser. No. 611,282
Claims priority, application Switzerland, Feb. 9, 1966, 1,829/66
Int. Cl. F16k *1/06, 1/12*
U.S. Cl. 251—122                                9 Claims

ABSTRACT OF THE DISCLOSURE

The pressure gradient valve has a valve seat formed internally with a bore having a converging portion and a subsequent diverging portion in the direction of flow. The piston has a portion within the converging portion converging in the same sense and a developed diverging portion within the diverging portion of the valve seat to direct a passing stream of fluid against the walls of the valve seat. This forms a stable film or layer of fluid thereon which avoid vibration, noise, erosion and damage by fatigue.

---

The invention relates to a pressure gradient valve. More particularly, the invention relates to a pressure gradient valve for large pressure gradients.

It has been known that great stresses occur in valves for large pressure gradients, for example, bypass valves for vapor generators operating at high subcritical or supercritical pressure, especially if a vapor-water mixture is flowing through the valves. In such cases, instabilities of the fluid flow generally arise an dresult in vibrations, noise, erosion and damage by fatigue of the valve components and adjacent pipes.

Heretofore, in order to reduce the instabilities and resulting phenomena in the fluid flow, it has been proposed to impart a twist to the medium stream flowing through a valve by means of special surfaces on the valve member. While this has reduced the above phenomena such phonomena have not been completely prevented in all load ranges, i.e. in all positions of the valve member. Further, the valve member has been relatively difficult to make and cannot be satisfactorily formed with hard metal.

Accordingly, it is an object of this invention to provide a valve which eliminates the above phenomena for all flow ranges and ratios of water to vapor.

It is another object of the invention to direct a fluid flow through a valve member into a layer of film of flow.

It is another object of the invention to minimize the erosion of a valve by a fluid flow therethrough.

It is another object of the invention to provide a valve member which can be easily formed to prevent instabilities in a fluid flow.

It is another object of the invention to provide a valve member for a valve which is not subject to cavitation.

Briefly, the invention provides a pressure gradient valve having a housing wherein a seat member is positioned for seating of a valve member which is rotatable and axially movable with respect to the seat member. The valve member is formed with a depending surface which has a downwardly converging portion and a lower downwardly diverging portion, for example, a surface in the shape of a hyperboloid of revolution. In addition, the seat member is formed with a conical downwardly converging portion substantially parallel to the converging portion of the valve member and a lower conical downwardly diverging portion. The diverging portion of the seat member is on an angle less than the angle of a tangent to the lower end of the diverging portion of the valve member.

A spigot is provided in the housing of the valve to conduct a pressure flow of fluid into the housing above the valve member and another spigot is provided in the housing below the valve member to direct an expanded flow of the fluid out of the housing.

When a flow of fluid passes between the valve member and seat member, it is directed by the diverging portion of the valve member onto the diverging portion of the seat member in the form of a stable layer or film of fluid so that vibration, noise, erosion and damage of the valve by fatigue are greatly reduced if not completely eliminated.

These and other objects and advantages of the invention will become more apparent from the following detailed description and appended claims taken in conjunction with the accompanying drawings in which:

FIG. 1 illustrates a part sectional view through a valve embodying the invention;

FIG. 2 illustrates an enlarged fragmentary view of the seat member and valve member of the invention;

FIG. 3 illustrates a valve connected to a discharge pipe;

FIG. 4 illustrates a valve connected to a discharge pipe of modified shape; and

Figure 5:
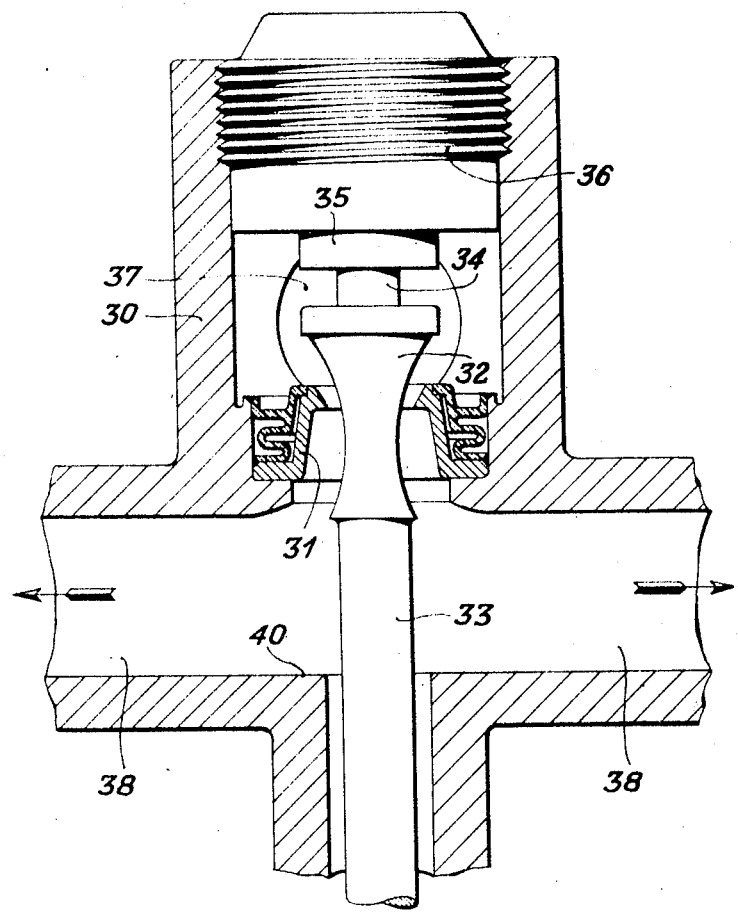
FIG. 5 illustrates another valve embodying the invention.

Referring to FIG. 1, a valve having a housing 1 which encloses an operating mechanism of known structure in the upper portion (not shown) contains a valve spindle 2 on which a valve member 3 is guided for rotation and axial movement in a vertical plane. The spindle 2 is guided in a guiding and packing member 4 of known construction in the usual manner. A seat member 5 is positioned on a flat surface or shoulder 7 in the housing 1 and is urged against the flat surface by a resilient member 8. The resilient member 8 is secured in the housing 1 above the seat member 5 by, for example, a weld 9 and is shaped to define a space 10 between the seat member 5 and itself for the containment of a stagnant medium, for example, water or water-vapor. A spigot 11 is formed on the valve housing 1 on one side of the valve member 3 for connection to a high pressure line and another spigot 12 is formed on the valve housing 1 on the opposite side of the valve member 3 with a cone shaped bore for discharge of an expanded medium.

Referring to FIGS. 1 and 2, the valve member 3 has an upper peripheral portion 14 with a flat sealing surface on the underside and a portion 16 next to the portion 14 with a surface in the form of a hyperboloid of revolution. The seat member 5 has a flat seat 17 adapted to cooperate with the sealing surface 15 on the valve member 3, a rounded portion 18 contiguous to the flat seat and a conical portion 20 contiguous to the rounded portion 18. The conical portion 20 is formed with a diameter which converges downwardly or diminishes in the direction of flow of the medium past the valve member. This conical portion 20 ends in a separating edge 21 (FIG. 2) which is followed by a conical portion 22 diverging downwardly or widening in the direction of flow of the medium. The cone angle *a* of the diverging conical portion 22 is made smaller than the angle *b* of the tangent to the contour of the valve member 3 at its downstream end.

Referring to FIGS. 1 and 3, the cross section of the spigot 12 adjacent to the seat member 5 and of the discharge pipe 25 connected to the valve are such that a cone shaped section of the pipe changes gradually into a straight section of pipe with a constant larger diameter.

Referring to FIG. 4, the spigot 12 can also be secured to a curved pipe 26 of a radius R so that the cone formed by the spigot and entrance portion of the pipe gradually merges into a pipe section of constant diameter.

In operation, in a valve under a high pressure of, for example, 250 atm. excess pressure, when the valve member 3 is lifted off the flat seat 17 of the seat member 5, the liquid component of the medium fed into the valve flows along the contour of the valve member 3. The flow is in the form of a layer which flares out and hits the lower portion of the conical surface 22 of the seat member 5. A film or layer of liquid then flows along the conical surface 22 of the seat member 5 to the wall of the spigot 12 and thence to the adjacent pipe 25 or 26.

Since this flow from the valve member across the walls of the surface 22, spigot 12 and pipe is very stable, even if the strokes of the valve member vary, there is little or no noise or vibration during the flow, even at the highest pressures. Erosion is also minimized since, in contrast to prior art valves, no solid jet ever hits a pipe wall whatever the flow.

In addition, those portions of the valve most subject to stress (i.e. the valve member 3 and seat member 5) may advantageously be given a hard metal facing, e.g. of stellite to further withstand erosion. Also, when the seat member 5 is attached by means of the resilient pressure member 8 as shown, it is easily replaced.

Separation of the actual sealing surface 15 of the valve member 3 from the hyperboloid portion 16 protects the sealing surface 15 and seat surface 17 as much as possible from erosion by the medium flowing through, since the pressure of the flow is not reduced between the sealing surfaces. Preferably, the shape of the conical surface 20 of the seat member 5 and the shape of that external surface of the valve member 3 having the same diameter (as shown in chain lines in FIG. 2) are such that when the valve is closed they are substantially parallel to one another and at a slight distance from each other. This further protects the valve seat since the minimum cross section (pressure-reducing portion) of the valve is near the separating edge.

As regards the contour of the valve member 3, this may alternatively have a shape which tapers or converges downwardly and then widens or diverges downwardly again in a form other than the hyperboloid shape mentioned. However, the hyperboloid shape is preferable for conditions of maximum stress, since it is constant for higher differentials and therefore there can be no cavitation of the liquid jet on account of discontinuities of the shape. Also, the hyperboloid shape is easy to produce on a lathe. In some cases, however, the hyperboloid shape cannot be used for structural reasons. In these cases the contour may, for example, be determined by two end points and tagents at these points. The best curve connecting these points can then be determined by the known mathematical method known as flattening differentials. In general, it is satisfactory in practice for four differentials of the curve to form constant functions.

As regards the seat member 5, the separating edge 21 creates more stable flow conditions at the transition between the two conical surfaces 20, 22. The valve therefore operates more quietly than if, for example, the transition was by way of a curved portion. Because the angles $a$, $b$ at the conical surface 22 and the downstream end of the valve member 3 are so chosen, the jet of liquid flowing round the valve member is directed onto the wall of the pipe and preferably onto the conical surface 22 of the seat member. Erosion is therefore minimal and, if the jet should hit the surface 22, is limited to a readily replaceable part.

Preferably, the discharge pipe is shaped like pipe 25 in FIG. 3 or pipe 26 in FIG. 4. These shapes, by giving a gradual transition from a flaring cross section to a constant cross section pipe, cause the flow of liquid to adhere to the pipe wall, even if there are slight discontinuities in this wall, e.g. welds, rough portions and so on.

Referring to FIG. 5, a valve for lower pressure of, for example, 180 atm. excess pressure, includes a housing 30 having a seat member 31 cooperating with a valve member 32. The valve member is connected to a valve spindle 33 downstream of the valve member 32 which leads downwards to an operating mechanism (not shown). The valve member also has a guide pin 34 positioned for guidance in a guide member 35. A closing member 36 which may, for example, be screwed into the housing, is positioned in the housing 30 near the guide member 35. The valve seat, its attachment and the attachment of the valve member are substantially the same in this case as in the embodiment of FIG. 1 and need not be further described and detailed. The medium whose pressure is to be reduced enters on one side of valve member 32 through a spigot 37 of which only the opening is shown and which is connected to a pipe (not shown) and is discharged in an expanded state through a pair of spigots 38 on the other side of the valve member 32.

In operation, when the valve member 32 lifts off the seat member 31, the medium flows through the space between the seat member and valve member in the same way as in the first embodiment shown in FIG. 1. After flowing round the valve member, however, the liquid in the medium, instead of adhering to a pipe wall in the form of a film, is reflected from a bottom end wall 40 of the housing 30. The liquid and any vapor contained in the medium are then discharged through the spigots 38.

The valve illustrated in FIG. 5 is more suitable for lower pressures and temperatures than the valve of FIG. 1, i.e. for cases in which there is less risk of erosion by jet of liquid. The main advantage of the valve is quiet and vibration-free operation in all aperture ranges of the valve. Mechanically, it has the advantage of greater accessibility of the valve seat and valve member and can be checked and serviced without dismantling the operating mechanism simply by removing the closing member 36.

What is claimed is:

1. A pressure gradient valve comprising:
   a housing,
   a seat member positioned in said housing having a seat thereon, a conical downwardly converging portion below said seat, and a conical downwardly diverging portion below said converging portion, and
   a valve member positioned in said housing within said seat member for vertical movement with respect to said seat member, said valve member having a sealing surface thereon for seating on said seat of said seat member and a surface depending from said sealing surface having a downwardly converging portion and a downwardly diverging portion below said converging portion,
   wherein said conical diverging portion of said seat member is at an angle smaller than the angle of a tangent to said surface of said valve member at the end of said downwardly diverging portion of said valve member.

2. A valve as set forth in claim 1 wherein said seat and said sealing surface are flat.

3. A valve as set forth in claim 1 wherein said housing adjacent said seat member includes a spigot having a cone shaped bore for discharging an expanded medium flowing through said housing.

4. A pressure gradient valve comprising:
   a housing,
   a seat member positioned in said housing having a seat therein,
   a resilient member secured in said housing urging said seat member against said housing, said resilient member and said seat member defining a space therebetween for containment of a stagnant medium, and
   a valve member positioned in said housing within said seat member for vertical movement with respect to said seat member, said valve member having a sealing surface thereon for seating on said seat of said seat member and a surface of rotation depending from said sealing surface having a downwardly converging portion and a downwardly diverging portion below said converging portion.

5. A pressure gradient valve comprising:
  a seat member having a seat thereon, a conical downwardly converging portion below said seat, a conical downwardly diverging portion below said converging portion, and a flat separating edge separating said diverging and converging portions; and
  a valve member within said seat member for relative movement therewith, said valve member having a sealing surface thereon for seating on said seat and a surface of rotation depending from said sealing surface having a downwardly converging portion substantially parallel to said conical downwardly diverging portion of said seat member and a downwardly diverging portion below said converging portion.

6. A valve as set forth in claim 5 wherein said surface of rotation of said valve member is in the shape of a hyperboloid of revolution.

7. A valve as set forth in claim 5 wherein said surface of rotation of said valve member has a contour of which four differentials produce constant functions.

8. In combination with a valve having a housing, a seat member positioned in said housing having a seat thereon and a conical downwardly converging portion, and a valve member positioned in said housing within said seat member for vertical movement with respect to said seat member, said valve member having a sealing surface thereon for seating on said seat of said seat member and a surface of rotation depending from said sealing surface having a downwardly converging portion parallel to said converging portion of said seat member and a downwardly diverging portion below said converging portion; a discharge pipe connected to said valve downstream of said valve member, said discharge pipe having a cone shaped section and a constant diameter section of larger diameter downstream of said cone shaped section, said cone shaped section gradually changing into said constant diameter section.

9. The combination as set forth in claim 8 wherein said discharge pipe is curved.

References Cited

UNITED STATES PATENTS

| 787,039 | 4/1905 | Harris. | |
| 1,991,052 | 2/1935 | Derby | 251—121 |
| 2,181,059 | 11/1939 | Lee | 251—210 X |
| 2,799,468 | 7/1957 | Van Deventer | 251—124 |

FOREIGN PATENTS

| 668,517 | 8/1963 | Canada. |
| 731,477 | 5/1932 | France. |

ARNOLD ROSENTHAL, Primary Examiner

U.S. Cl. X.R.

251—359